Nov. 19, 1935.  J. G. BEVAN  2,021,679
TREATING SEWAGE
Filed Aug. 7, 1934
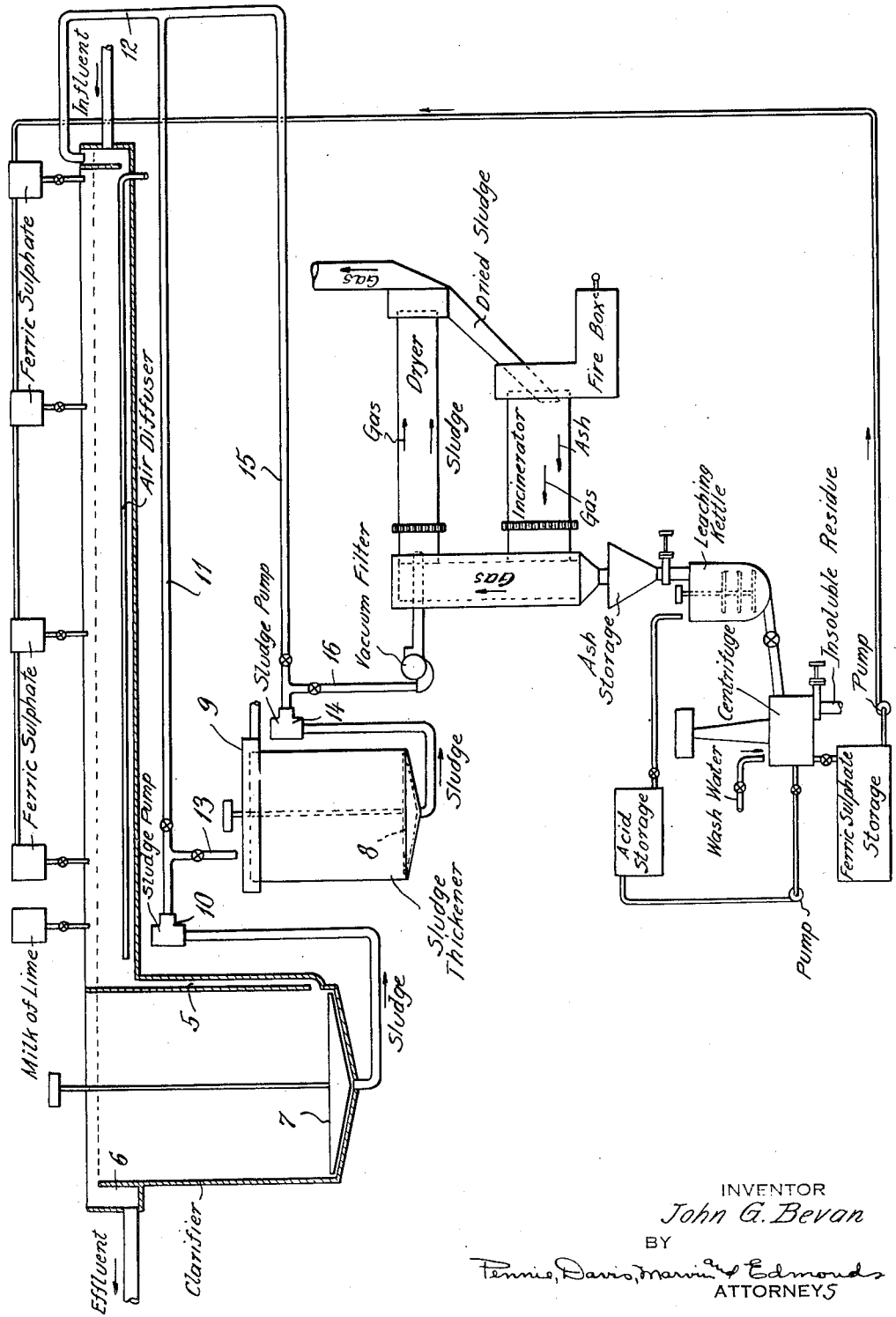
INVENTOR
John G. Bevan
BY
Pennie, Davis, Marvin & Edmonds
ATTORNEYS Patented Nov. 19, 1935

2,021,679

UNITED STATES PATENT OFFICE 2,021,679

TREATING SEWAGE

John G. Bevan, New York, N. Y., assignor to Guggenheim Brothers, New York, N. Y., a copartnership Application August 7, 1934, Serial No. 738,781

5 Claims. (Cl. 210—2)

This invention relates to sewage treatment and has for an object the provision of an improved process for treating sewage and similar waste liquors. More particularly, the invention contemplates the provision of an improved process for removing putrescible matter from sewage and similar waste liquors. The invention further contemplates the provision of a process for treating sewage involving the use of sludge obtained during the course of the process in conjunction with an iron compound or a compound of a trivalent metal for coagulation of suspended matter contained in the sewage. The process of the invention may also include the use of an alkaline agent such as lime when necessary, for adjusting the pH value of the sewage in order to provide for improved settling and/or improved filtration. The invention can be employed with particular advantage in the first stage of the sewage treating process described in the United States patent to Gleason and Loonam, No. 1,886,267 of November 1, 1932.

In ordinary raw sewages and similar waste liquors, putrescible matter, consisting of carbon, hydrogen, sulphur, etc. in various combinations, is present in two forms, namely: (1) insoluble (suspended matter), (2) soluble. In any sewage treating operation, it is customary to remove the coarser and heavier insoluble matter by screening. After screening, the concentration of the insoluble putrescible matter remaining in the sewage is extremely low, for example, an average municipal sewage contains around 150 to 200 parts per million of dispersed or finely divided solid matter largely in colloidal suspension. This finely divided putrescible matter includes simple and complex compounds resulting from the breaking down of proteins.

The present invention contemplates certain improvements in the removal of such suspended putrescible matter from sewage by coagulation, flocculation or entrainment in a settleable sludge. I have discovered that the removal of such suspended putrescible matter from sewage is promoted by aerating the sewage in the presence of an added metal compound such, for example, as a compound of iron or aluminum and a quantity of sludge produced during the course of the process. I prefer to employ one or more soluble compounds of iron or aluminum for addition to the sewage being aerated. I may employ, for example, ferrous sulphate, ferric sulphate or aluminum sulphate, or any desired mixtures of these compounds.

In a preferred process of the invention, the returned sludge is added to the sewage at the commencement of the aerating treatment or shortly after the raw sewage enters the aeration vessel. The metal compound may be added to the sewage at any desired stage of the aerating treatment. When ferric sulphate is employed, it is preferably added to the sewage during the course of its aeration within about two to fifteen minutes prior to the completion of the aerating treatment. Aluminum sulphate also is preferably added within about two to fifteen minutes prior to the completion of the aeration treatment. Ferrous sulphate is preferably added to the sewage within about ten to thirty minutes before the end of the aeration treatment.

Good results may be obtained if the period of aeration following the addition of the ferric sulphate or aluminum sulphate is just sufficient to permit thorough dissemination of the compound. The period of aeration may be varied considerably. Good results may be obtained if aeration is carried out for a period of about one-half hour or less, and little or no additional advantage may be gained by continuing aeration for a period of time longer than about one hour.

If the pH of the sewage is 7 or lower near the end of the aeration period and it is desired to increase the pH to a value above 7, an amount of an alkaline agent such as lime sufficient to increase the pH to the desired value may be added prior to the completion of the aeration treatment. Usually, it will not be necessary or desirable to adjust the pH of the sewage by the addition of an alkaline agent, as I have found that highly satisfactory precipitation, settling and clarification can be obtained even when the pH is considerably below 7. If the addition of an alkaline agent is desired or required for any purpose, it is preferably added after the soluble metal compound has been added and thoroughly disseminated throughout the sewage. Following the aeration treatment, the sewage is introduced into a clarifier underneath a layer or blanket of settling sludge so that the liquor flows upwardly through the sludge blanket and overflows from the clarifier with a practically negligible amount of suspended matter.

In carrying out the process of the invention in its preferred and complete form, the raw sewage, after appropriate screening is mixed with returned sludge in an aeration vessel and aeration of the mixture is commenced. The aeration vessel employed is preferably of the type which permits a continuous flow of the mixture undergoing treatment from an entrance end to a discharge end and the rate of flow is preferably controlled to provide a period of about one hour between the time of entry and the time of discharge of the sewage. Aeration of the sewage is preferably continued throughout its entire period of detention in the aeration vessel.

As the mixture undergoing treatment is flowing through the aeration vessel, a soluble iron compound, preferably in the form of a ferric sulphate solution of 50 grams per liter concentration is added to the mixture at a point corresponding to an interval of about 2 to 15 minutes before the time of discharge of the mixture from the vessel. Prompt diffusion of the solution throughout the mixture is produced by the agitation resulting from aeration. The oxygen in the air keeps the iron in the ferric condition. When a ferrous salt such as ferrous sulphate is employed, the oxygen of the air converts the iron to the ferric condition.

The incoming raw sewage ordinarily has a pH of around 7 to 7.5. In the coagulating treatment, the trivalent metal ions are precipitated, probably in the form of ferric hydroxide as well as in the form of simple and complex organic ferric compounds. The sulphate ions of the added ferric sulphate tend to lower the pH of the sewage to a value below 7, but this tendency is largely counteracted by the effects of the aeration and the returned sludge, and the sewage at the conclusion of the ferric sulphate treatment may have a pH equivalent to that of the incoming raw sewage. Substantially all the iron added as ferric sulphate is precipitated, and it appears that this precipitated iron together with the iron returned with the sludge forms a blanket of ferric hydroxide which acts as a collector of suspended matter. The returned sludge and the aeration treatment also aid in effecting precipitation of the suspended matter. Also aeration of the sewage causes oxidation of a considerable amount of the dissolved putrescible matter.

The amount of iron added to the sewage depends to some extent at least, upon the amount of suspended putrescible matter in the sewage. In the treatment of the average municipal sewages, 5 to 25 parts per million of iron produce satisfactory coagulation and precipitation of the suspended solids, and, generally, less than 20 parts per million of iron produce satisfactory results. In the treatment of industrial waste liquors such, for example, as dairy plant and packing plant waste liquors, 20 to 50 parts per million of iron may be required to produce satisfactory coagulation and precipitation of suspended solids. Satisfactory aeration is obtained with from 0.01 to 0.1 cubic feet of air per gallon of sewage treated. It appears that the oxygen of the air employed for aeration functions chiefly to oxidize putrescible matter and is not absorbed by the sludge. This is indicated by rapid elimination of dissolved putrescible matter and the presence of dissolved oxygen in the clarifier overflow.

If adjustment of the pH is desirable following the treatment with ferric sulphate, the sewage may be aerated in the presence of an alkaline agent, such as lime, in amount sufficient to give a pH of the desired value. Adjustment of the pH to a value above 7 may sometimes improve settling and filtration. Lime is preferable to other alkaline agents for this operation because it gives a denser floc and one which settles very rapidly, and because it is inexpensive. Lime is preferably added to the sewage as milk of lime in 50 grams per liter concentration. Where dissolved putrescible matter is to be subsequently removed from the sewage liquor by a base exchange (zeolite) treatment, it is preferable to carefully regulate the amount of lime added to the sewage to give a pH of about 7.2 to 7.6.

Following the treatment with lime, the sewage passes to a clarifier, into which it is introduced near the bottom, passing upward through a blanket of settling sludge. Clarified liquor overflows and settled sludge is removed from the bottom of the clarifier, preferably being raked or otherwise mechanically worked along the bottom of the clarifier towards the sludge discharge outlet. The supernatant liquor is substantially free from suspended matter and may advantageously be subjected to a base exchange treatment as described in the aforementioned patent to Gleason and Loonam.

The sludge from the bottom of the clarifier may be conducted in part to a thickener and in part to the aeration vessel. Clarified liquor overflows and settled sludge is removed from the bottom of the thickener. The clarifier and thickener effluents may be combined for appropriate disposal or for subsequent treatment. The sludge from the thickener, containing about 3 to 10% solids, may be conducted in part to the aeration vessel and in part to a suction filter where its moisture content is reduced. All of the sludge returned may be obtained from the clarifier, all may be obtained from the thickener, or a portion may be obtained from the thickener and a portion from the clarifier. About 20 to 75%, more or less, of the sludge is returned to the aeration vessel. The amount of sludge returned may vary considerably. Ordinarily, sludge return may be controlled advantageously to establish in the sewage-sludge mixture undergoing treatment in the aeration vessel an amount of suspended matter equal to about two to eight times the amount of suspended matter in the incoming raw sewage.

It is my preferred practice to completely destroy the organic matter in the filter cake by incineration. A rotary kiln incinerator consisting of two sections, namely, a drying section and a burning section is admirably adapted for the purpose. In both the dryer and incinerator sections of the unit, the air travels concurrently with the solids and gases. The dryer section is operated at a temperature which does not cause decomposition or carbonization of the sludge, and the incinerator section is operated at a temperature of about 650–700° C. This incinerating temperature is sufficiently high to destroy the putrescible matter. The incinerating temperature is preferably kept below 700° C. so that sintering of the residue is avoided. A substantial amount of the heat required for incinerating is obtained by the burning of the sludge. In fact, the calorific value of the sludge is such that in a large scale operation no extraneous fuel is required for incineration.

The incinerated residue is treated with sulphuric acid for the regeneration of the ferric sulphate which is again used in the process.

The single figure of the accompanying drawing is a diagrammatic flow sheet of a system adapted for carrying out the process of the invention.

The raw sewage is first passed through a coarse screen and then through a fine screen (not shown in the drawing) to remove coarse and heavy solid matter. The screened sewage is treated according to the process of the invention.

In the apparatus illustrated in the drawing, aeration of the sewage is carried out in a long tank or basin one end portion of which receives the incoming sewage and the other end portion of which discharges into a clarifier. Returned sludge is added to the raw sewage as it enters the aeration basin and thorough mixing of the sludge and sewage is accomplished by air agitation. In this apparatus, the rate of flow of the sewage through the aeration basin is such as to give a detention period of about one hour. Ferric sulphate solution is preferably added to the sewage in the aeration basin at a point corresponding to an interval of about 2 to 15 minutes before the time of discharge of the sewage into the clarifier, but provision is made for the addition of the ferric sulphate at a number of points between the entrance end and the discharge end of the basin. The ferric sulphate may be added to the sewage in the aeration vessel at one or more points during the course of flow of the sewage through the aeration vessel. If the addition of an alkaline agent is required or desired for adjustment of the pH of the sewage, milk of lime is added between the point of addition of the ferric sulphate and the discharge end of the aeration vessel and spaced sufficiently from the point of addition of the ferric sulphate to permit thorough dissemination of the ferric sulphate in the sewage before the lime is added. A common air diffuser extends throughout the length of the aeration vessel and provides a source of air for aeration and agitation. The air diffuser may be of any suitable construction.

The clarifier illustrated in the drawing comprises a tank having a peripheral charging well 5 (extending approximately around one third of the circumference of the tank) and discharging into the bottom of the tank. Clarified liquor overflows in a launder 6 opposite the charging well and extending approximately around one-third of the upper circumference of the tank. A raking mechanism 7 moves sludge settling on the bottom of the tank towards the centrally positioned sludge discharge outlet. It is to be understood that other forms and types of clarifier may be used in practicing the invention. I have found that the introduction of the sewage near the bottom of a settling chamber beneath a settling mass of sludge therein materially aids in the production of a supernatant liquor substantially free from suspended matter.

Sludge from the clarifier is pumped by means of a pump 10 to a thickener having a sludge raking mechanism 8 and an overflow launder 9, or in part to the thickener and in part to the entrance end of the aeration vessel. The sludge pump 10 communicates with a conduit 11 which leads to a sludge return conduit 12 A by-pass conduit 13 is provided for conducting sludge from the pump 10 and conduit 11 to the thickener. Suitable valves are provided in the conduits 11 and 13 to control and distribute the flow of sludge therethrough. The clarifier and thickener effluents may be combined for appropriate disposal or for subsequent treatment, as for example by zeolite filters as described in the aforementioned patent to Gleason and Loonam.

A portion of the sludge from the thickener may be conducted by means of a pump 14 and conduit 15 to the sludge return conduit 12 leading to the entrance end of the aeration vessel. Suitable valves are provided in the conduits 15 and 16 to control and distribute the flow of sludge therethrough. The remainder of the sludge from the thickener is conducted through the conduit 16 to a suction filter. The filter-cake is conveyed to the dryer and incinerator.

The sludge returned to the aeration vessel (20% to 75%, more or less) may be returned entirely either from the clarifier or from the thickener, or a portion may be returned from the clarifier and a portion from the thickener.

Both the dryer and incinerator are rotatably mounted cylinders in which the solid material and gases (for drying and incinerating) travel concurrently. Thus, the exhaust gas from the incinerator moves through the dryer concurrently with the sludge, and the dried sludge enters the incinerator along with hot gases from an oil burner or other heating means. An adequate amount of oxygen or other combustion supporting gas enters the incinerator (along with the hot gases of combustion of the extraneous fuel) to burn the organic and other combustible matter in the dried sludge. The incinerator residue or ash is discharged from the incinerator to a storage container from whence it is appropriately fed to a jacketed leaching kettle. In the kettle, the incinerated residue is treated with sulphuric acid, being appropriately agitated and also heated if necessary, for the regeneration of ferric sulphate. The contents of the kettle is delivered to a centrifuge for the removal of excess acid. The centrifuged cake is leached with water to dissolve the ferric sulphate present and the insoluble residue is filtered off and discarded. The regenerated ferric sulphate solution is pumped back for reuse in the coagulation of fresh incoming sewage.

It will of course be understood that the apparatus illustrated in the drawing is merely illustrated and is not intended to be restrictive of the invention in any respect.

In the following table are given the daily results obtained over a period of eleven days in tests conducted for the purpose of comparing the results obtainable by means of the process of the present invention with results obtainable in a similar process omitting the sludge return and period of aeration prior to the addition of the ferric sulphate. In carrying out the tests of the process of the invention, about 75% of the sludge obtained in the clarifier (containing about 4% solids) was returned directly from the clarifier to the aeration vessel, aeration was continued for one hour periods and ferric sulphate was added to the aeration vessel about five minutes before the end of the aeration period. The biochemical oxygen demand (B. O. D.), suspended matter, iron and lime are given in parts per million. The purified effluent was the supernatant liquor from the clarifier. In carrying out the tests sewage from two different sources was treated, the sewage from the different sources being treated on alternate days. In the table, the process of the invention is identified as "Process A" and the process used for comparison is identified as "Process B". The standard 5 day test, using seeded diluting water, was employed in determining the biochemical oxygen demand.

| Date | Raw influent | | Reagents added | | | | Purified effluent | | | |
|---|---|---|---|---|---|---|---|---|---|---|
| | | | Iron | | Lime | | B. O. D. | | Suspended matter | |
| | B. O. D. | Suspended matter | Process A | Process B | Process A | Process B | Process A | Process B | Process A | Process B |
| July 4 | 385 | 280 | 20 | 20 | 0 | 0 | 30 | 58 | 18 | 17 |
| 5 | 290 | 312 | 20 | 20 | 0 | 0 | 20 | 40 | 12 | 16 |
| 6 | 260 | 140 | 20 | 20 | 0 | 10 | 14 | 45 | 8 | 10 |
| 8 | 290 | 372 | 20 | 20 | 0 | 30 | 15 | 28 | 20 | 26 |
| 9 | 425 | 484 | 20 | 22 | 0 | 30 | 4 | 34 | 6 | 8 |
| 10 | 240 | 276 | 20 | 22 | 0 | 30 | 6 | 21 | 8 | 7 |
| 11 | 340 | 280 | 20 | 22 | 0 | 30 | 19 | 56 | 18 | 20 |
| 12 | 415 | 495 | 20 | 20 | 0 | 30 | 9 | 36 | 10 | 12 |
| 13 | 335 | 352 | 20 | 22 | 0 | 30 | 16 | 26 | 12 | 14 |
| 15 | 220 | 232 | 20 | 22 | 0 | 30 | 16 | 32 | 10 | 8 |
| 16 | 280 | 260 | 20 | 22 | 0 | 30 | 18 | 36 | 14 | 10 |

While I have described my preferred process as including the use of ferric sulphate, it will be understood that other metal compounds may be used advantageously in accordance with my invention. Thus, for example, ferrous sulphate, when added at an appropriate time may cause a better B. O. D. reduction than can be accomplished in using ferric sulphate. For this reason, and because ferrous sulphate is less expensive than ferric sulphate, the use of ferrous sulphate may be preferable. Also, results similar to those obtained in using ferric sulphate may be obtained by employing aluminum sulphate. Mixtures of various compounds may be employed advantageously, and desirable results may be obtained by adding two or more compounds separately. For example, I have obtained extremely good results by adding small amounts of aluminum sulphate within a minute or two after the final addition of ferric sulphate. The amounts of aluminum sulphate employed were equal to about ten percent of the amounts of ferric sulphate employed. I have also obtained very desirable results by adding a solution made by dissolving both aluminum sulphate and ferric sulphate, about 1 part of aluminum sulphate to 10 parts of ferric sulphate.

The process of my invention is admirably adapted for the treatment of industrial waste liquors as well as ordinary municipal or domestic sewages. It is characteristic of the process of the invention that an extremely rapidly settling sludge is produced and high elimination of putrescible matter is accomplished. Sludge produced in carrying out the method of the invention settles several times as fast as sludge produced in processes in common use. It is not unusual to obtain upon standing for five minutes a clear supernatant liquid which may be decanted, and I have accomplished B. O. D. reductions of nearly 99% in the normal operation of the process on many occasions.

I claim:

1. The process of treating sewage which comprises subjecting the sewage to aeration in the presence of added sewage sludge produced in the course of the process and a water-soluble compound of a trivalent metal and thereby coagulating putrescible matter contained in the sewage in the form of a settleable sludge, separating the resulting settleable sludge from the accompanying liquor, and utilizing the separated sludge as the source of said added sludge for incorporation in sewage undergoing the aforesaid aeration treatment.

2. The process of treating sewage which comprises subjecting the sewage to aeration in the presence of added sewage sludge produced in the course of the process and a water-soluble compound of iron and thereby coagulating putrescible matter contained in the sewage in the form of a settleable sludge, separating the resulting settleable sludge from the accompanying liquor, and utilizing the separated sludge as the source of said added sludge for incorporation in sewage undergoing the aforesaid aeration treatment.

3. The process of treating sewage which comprises subjecting the sewage to aeration in the presence of added sewage sludge produced in the course of the process and iron sulphate and thereby coagulating putrescible matter contained in the sewage in the form of a settleable sludge, separating the resulting settleable sludge from the accompanying liquor, and utilizing the separated sludge as the source of said added sludge for incorporation in sewage undergoing the aforesaid aeration treatment.

4. The process of treating sewage which comprises subjecting the sewage to aeration in the presence of added sewage sludge produced in the course of the process and ferric sulphate and thereby coagulating putrescible matter contained in the sewage in the form of a settleable sludge, separating the resulting settleable sludge from the accompanying liquor, and utilizing the separated sludge as the source of said added sludge for incorporation in sewage undergoing the aforesaid aeration treatment.

5. The process of treating sewage which comprises subjecting the sewage to aeration in the presence of added sewage sludge produced in the course of the process, ferric sulphate and aluminum sulphate and thereby coagulating putrescible matter contained in the sewage in the form of a settleable sludge, separating the resulting settleable sludge from the accompanying liquor, and utilizing the separated sludge as the source of said added sludge for incorporation in sewage undergoing the aforesaid aeration treatment.

JOHN G. BEVAN.